US 11,319,686 B2

(12) United States Patent
Allara et al.

(10) Patent No.: US 11,319,686 B2
(45) Date of Patent: May 3, 2022

(54) TRANSPORTABLE MODULAR SYSTEM FOR EMERGENCY TREATMENT OF WATER POLLUTED BY LIQUID HYDROCARBON SPILLAGE

(71) Applicant: SAIPEM S.p.A., San Donato Milanese (IT)

(72) Inventors: Paolo Mario Alessandro Allara, Dresano (IT); Fabrizio Bonifacio, Milan (IT)

(73) Assignee: SAIPEM S.P.A., San Donato Milanese (IT)

( * ) Notice: Subject to any disclaimer, the term of this patent is extended or adjusted under 35 U.S.C. 154(b) by 50 days.

(21) Appl. No.: 16/644,824

(22) PCT Filed: Sep. 20, 2018

(86) PCT No.: PCT/IB2018/057260
§ 371 (c)(1),
(2) Date: Mar. 5, 2020

(87) PCT Pub. No.: WO2019/058302
PCT Pub. Date: Mar. 28, 2019

(65) Prior Publication Data
US 2021/0071379 A1    Mar. 11, 2021

(30) Foreign Application Priority Data
Sep. 20, 2017  (IT) .......................... 102017000105300

(51) Int. Cl.
*E02B 15/04*  (2006.01)
*B01D 17/04*  (2006.01)
(Continued)

(52) U.S. Cl.
CPC .......... *E02B 15/045* (2013.01); *B01D 17/045* (2013.01); *B01D 17/12* (2013.01);
(Continued)

(58) Field of Classification Search
None
See application file for complete search history.

(56) References Cited

U.S. PATENT DOCUMENTS 4,053,414 A    10/1977  In'tVeld
4,650,581 A    3/1987  Angles et al.
(Continued)

FOREIGN PATENT DOCUMENTS

WO    WO 2015/074131    5/2015

OTHER PUBLICATIONS

Notification Concerning Submission, Obtention or Transmittal of Priority Document for International Application No. PCT/IB2018/057260 dated Jan. 10, 2019.
(Continued)

*Primary Examiner* — Richard C Gurtowski
(74) *Attorney, Agent, or Firm* — Neal, Gerber & Eisenberg LLP

(57) ABSTRACT

A transportable modular system for emergency treatment of water polluted by liquid hydrocarbon spillage comprises: at least a first containerized treatment module, comprising a container in the form of a standard size intermodal container which houses a coalescence separator device, configured to operate an oil/water separation; a suction pipe having a first end connected to the coalescence separator device and a second end provided with an inlet connected to at least one floating skimmer; a pump positioned on the suction pipe; a water drain pipe and an oil drain pipe, connected to a water outlet and an oil outlet, respectively, of the coalescence separator device.

10 Claims, 3 Drawing Sheets

(51) Int. Cl.
  *B01D 17/12* (2006.01)
  *C02F 1/00* (2006.01)
  *C02F 1/40* (2006.01)
  *G08B 21/18* (2006.01)
  *C02F 101/32* (2006.01)

(52) U.S. Cl.
  CPC ............... *C02F 1/008* (2013.01); *C02F 1/40* (2013.01); *G08B 21/182* (2013.01); *C02F 2101/32* (2013.01); *C02F 2201/008* (2013.01); *C02F 2209/003* (2013.01); *C02F 2301/046* (2013.01)

(56) References Cited

U.S. PATENT DOCUMENTS

2014/0190878 A1  7/2014  Nagel
2014/0216998 A1* 8/2014  Al-Hadhrami ......... B01D 17/12
                                              210/138

OTHER PUBLICATIONS

International Search Report and Written Opinion for International Application No. PCT/IB2018/057260 dated Dec. 3, 2018.
PCT Demand for International Preliminary Examination and Reply to International Search Report and the associated Written Opinion for International Application No. PCT/IB2018/057260 dated Jul. 18, 2019.
Notification of Receipt of Demand by Competent International Preliminary Examining Authority (Form PCT/IPEA/402) for International Application No. PCT/IB2018/057260 dated Jul. 24, 2019.
Second Written Opinion for International Application No. PCT/IB2018/057260 dated Aug. 9, 2019.
Reply to the Second Written Opinion for International Application No. PCT/IB2018/057260 dated Oct. 4, 2019.
Notification of Transmittal of the International Preliminary Report on Patentability (Form PCT/IPEA/416) for International Application No. PCT/IB2018/057260 dated Jan. 3, 2020.

* cited by examiner

TRANSPORTABLE MODULAR SYSTEM FOR EMERGENCY TREATMENT OF WATER POLLUTED BY LIQUID HYDROCARBON SPILLAGE

PRIORITY CLAIM

This application is a national stage application of PCT/IB2018/057260, filed on Sep. 20, 2018, which claims the benefit of and priority to Italian Patent Application No. 102017000105300, filed on Sep. 20, 2017, the entire contents of which are each incorporated by reference herein.

TECHNICAL FIELD

The present disclosure relates to a transportable modular system for emergency treatment of water polluted by liquid hydrocarbon spillage.

BACKGROUND

The serious problem of water pollution in the event of spillage of liquid hydrocarbons (typically, petroleum) is known. Particularly serious situations occur, for example, as a result of accidents at sea involving facilities or vessels for hydrocarbon extraction or transport.

A common intervention strategy in case of liquid hydrocarbon spillage in water, for example from vessels or extraction plants, comprises the containment of the pollutant by floating booms and the subsequent removal and transport thereof to a dedicated processing plant.

Normally, the pollutant is taken together with a significant quantity of water, as no effective separation instruments are available which can be used directly on the site of the spillage.

Consequently, it is necessary to draw, transport and process large volumes of liquid.

Alternatively, in some cases, the oil mass is directly combusted in-situ, with negative implications from the environmental pollution point of view.

Still in the case of operating directly on the spot, treatment with chemical products designed to promote the dispersion of the oily mixture into the environment is known, with many negative aspects affecting the marine ecosystem.

Ultimately, certain known technologies do not allow a fully effective and complete treatment of the pollutant directly on site.

SUMMARY

It is an object of the present disclosure to provide a system for the treatment of water polluted by spillage of liquid hydrocarbons (petroleum and similar oily liquids), which enables certain of the drawbacks of certain of the prior art to be overcome.

Therefore, the present disclosure relates to a transportable modular system for emergency treatment of water polluted by spillage of liquid hydrocarbons (in particular, petroleum and similar oily liquids) including a containerized treatment module comprising an intermodal container which houses a coalescence separator device configured to operate an oil/water separation; a suction pipe having a first end connected to the coalescence separator device and a second end with an inlet connected to a floating skimmer; a volumetric pump positioned along the suction pipe; a water drain pipe connected to a water outlet of the coalescence separator device; and an oil drain pipe connected to an oil outlet of the coalescence separator device.

The present disclosure enables water polluted by spillage of liquid hydrocarbons (hereinafter also simply referred to as oil) to be relatively effectively treated directly on the site of the spillage.

In certain embodiments, the system of the present disclosure is based on the use of transportable modules, such as containerized modules (i.e., made in the form of standard size intermodal containers), which can be transported by road and/or rail to a harbour and then loaded on a vessel to reach the site of the spillage. In this way, a generic vessel, even if not specifically equipped for interventions of water treatment and normally assigned to a different task, can be used if necessary to cope with a spillage of liquid hydrocarbons into the sea, and then go back to its usual tasks when the emergency is over.

The system of the present disclosure, once brought to the site of the spillage, treats the polluted water directly on the spot and in real time.

The polluted water is drawn with a volumetric pump fed by a skimmer, so as to maximize the content of hydrocarbons with respect to water and at the same time minimize the formation of water/oil emulsions.

The polluted water is then treated immediately and continuously by a coalescence separator device (or filter) that separates the water from the hydrocarbons/pollutants, in fluidic continuity with the drawing.

In particular, the coalescence separator device is of the mechanical type operating by contact on coalescence surfaces.

A coalescence separator device of this type (also commonly called coalescing filter) generally comprises coalescence surfaces immersed in a treatment tank and intended for contact with a liquid stream to be treated. The coalescence surfaces are configured so as to be contacted by a liquid flow circulating in the coalescence separator device and to promote the aggregation of droplets of a dispersed phase present in the flow. In other words, the coalescence surfaces are shaped and placed in the device so as to promote the aggregation of droplets of a dispersed phase present in the flow lapping the surfaces.

In general, the coalescence surfaces can take several shapes and arrangements, for example being smooth, undulated or corrugated, provided with channels, etc.

In certain embodiments, the coalescence separator device is a coalescing plate separator device (i.e., the coalescing surfaces are placed on plates that can have various shapes and be organized according to different schemes, with different orientations and arrangements from each other).

It should be appreciated that in addition to the coalescing plate separator devices, other types of devices operating in a similar manner according to the same physical principles can be used, such as for example the so-called "walnut shell" or "sheet" coalescence separator devices.

The pollutants recovered from the separator device are stored on board the vessel and then transported to shore for the final treatment and recovery of hydrocarbons. For example, the pollutants are stored in a tank present on the vessel itself; or, according to a further aspect of the present disclosure, in one or more tanks housed in another module of the system.

The treated water, having a content of pollutants within predetermined concentration limits (for example, limits set by the law), are re-introduced into the environment (the sea) directly on the site, in real time. In this way, separation is carried out on the spot, and as regards transportation to shore, only the volume of the pollutants needs to be accounted for, which is normally equal to approximately a quarter of the total, with relatively significant cost savings.

In order to prevent oil emulsions from forming, with consequent greater collection difficulty, the separator device is not only characterised by the absence of rotating parts (being based on the use of coalescence surfaces), but is also fed by a volumetric pump, avoiding the presence of centrifugal pumps.

The present disclosure therefore achieves the following main advantages:

the possibility of immediate intervention or reduced intervention times;

relative ease of transportation, installation, and disassembly at the end of the operations;

relatively high efficiency water treatment;

relative ease of use;

relatively very low commissioning costs and relatively very low energy consumption;

minimal maintenance both in use and in storage.

Additional features are described in, and will be apparent from the following Detailed Description and the figures.

BRIEF DESCRIPTION OF THE DRAWINGS

Further features and advantages of the present disclosure will be apparent from the description of the following non-limiting embodiments with reference to the figures of the accompanying drawings, wherein.

DETAILED DESCRIPTION

Figure 1:
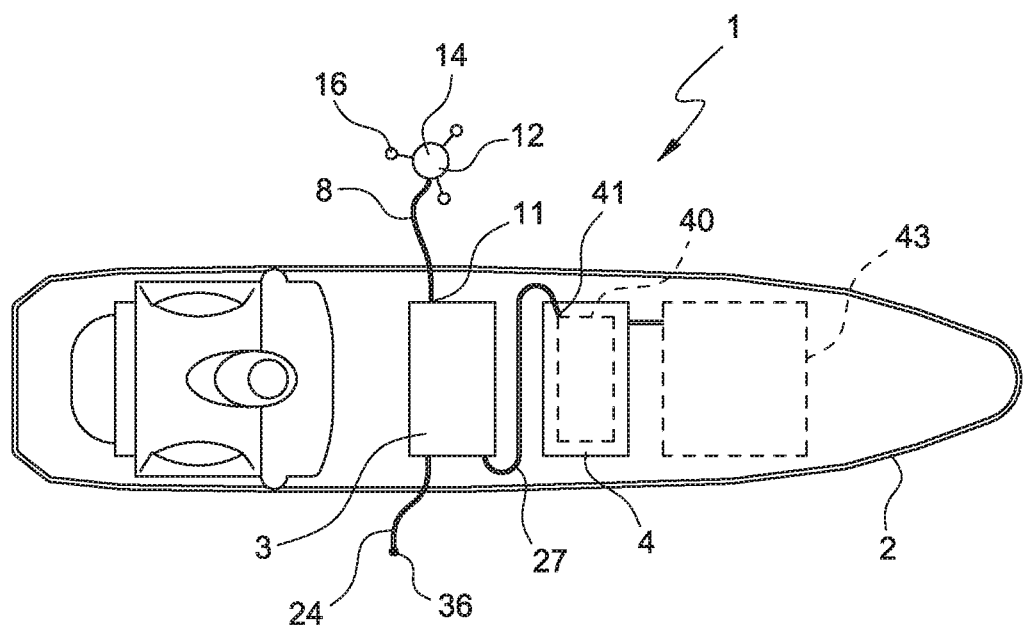
FIG. 1 is a schematic plan view of a transportable modular system for emergency treatment of water polluted by liquid hydrocarbon spillage in accordance with the present disclosure, installed on board a vessel, for example a ship.

The numeral 1 in FIG. 1 shows, as a whole, a transportable modular system for emergency treatment of water polluted by spillage of liquid hydrocarbons (in particular, petroleum and similar oily liquids; hereinafter also simply referred to as oil), installed on board a vessel 2, for example a ship.

The system 1 can be installed on board vessels and floating units of various kinds, for example ships or other units for oil well drilling ("drillships") and offshore hydrocarbon production, commonly referred to as floating production units ("FPU"), in particular comprising floating storage and offloading vessels ("FSO") and floating production storage and offloading vessels ("FPSO").

It is understood that the system may be installed on other types of ships, vessels, and floating units in general (also platforms), also depending on the naval vessels available for intervention in the area affected by pollution, or used in areas potentially susceptible to accidents.

The system 1 comprises at least a first treatment module 3, and optionally one or more storage modules 4.

The modules 3, 4 are containerized modules (i.e., with the shape of a standard size intermodal container transportable by truck as well as by railway wagon and ship).

Figure 2:
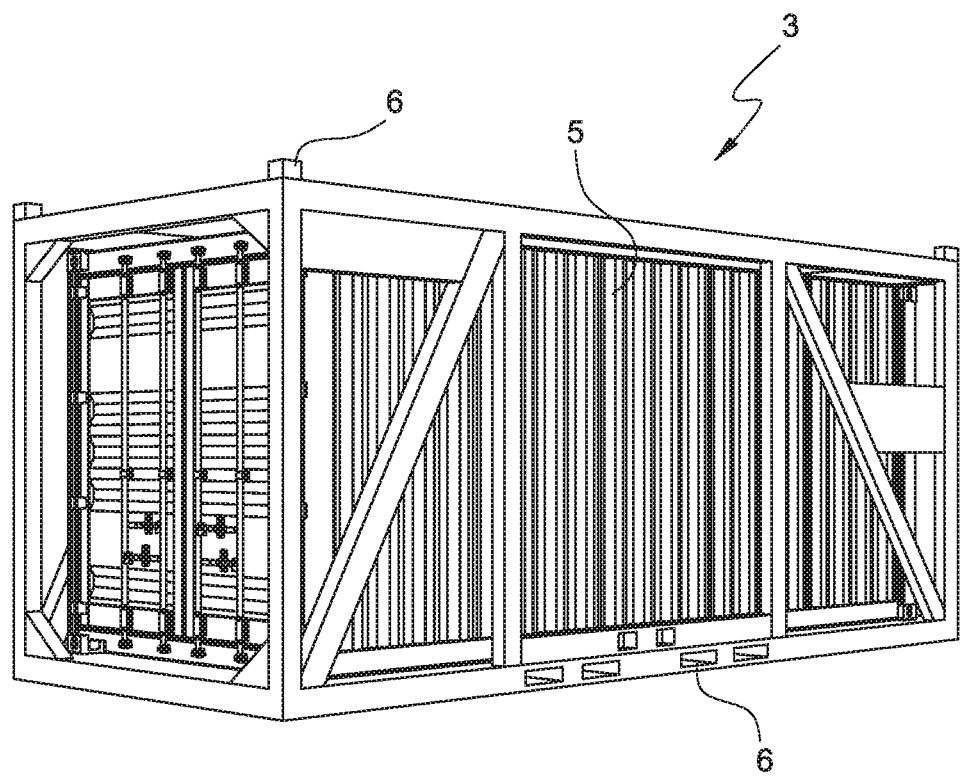
FIG. 2 is a schematic view of a module of the system of FIG. 1.

In greater detail, as shown in FIG. 2, each module 3, 4 comprises a frame or container 5 in the form of a standard size intermodal container provided with standard connecting elements 6 for the taking and fixing on the various avenues of transport.

Figure 3:
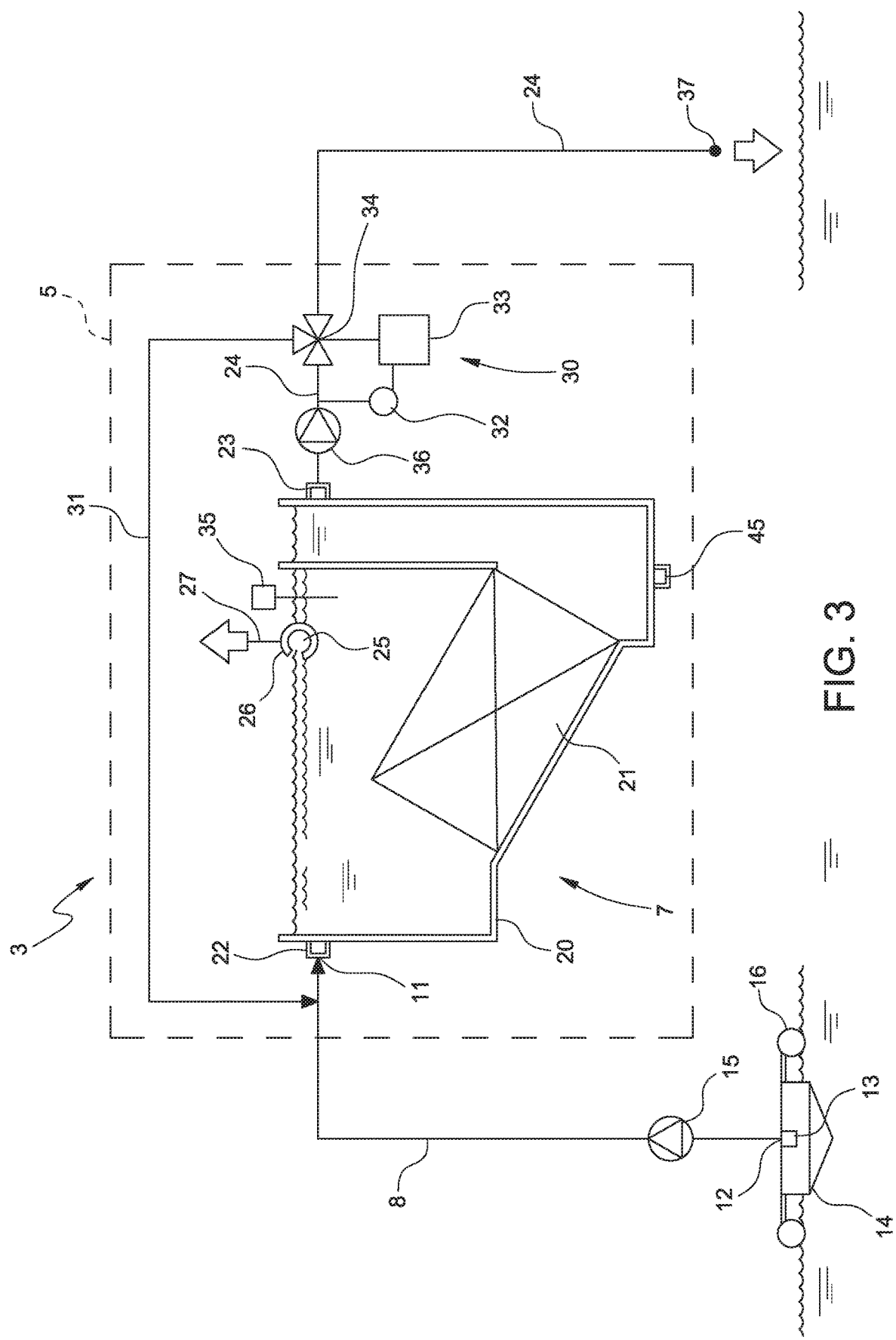
FIG. 3 is a schematic view of the main components of a module, in particular a treatment module, forming part of the system of FIG. 1.

Also with reference to FIG. 3, the treatment module 3 comprises: at least one separator device 7 housed in the container 5 and configured to separate the hydrocarbons/pollutants (oil) from the water; a suction pipe 8 having a first end 11 connected to the separator device 7 and a second end 12 equipped with an inlet 13 connected to at least one floating skimmer 14; and a pump 15 positioned on the suction pipe 8, such as (but not necessarily) at the end 12.

In particular, the suction pipe 8 is a flexible pipe which can be unwound from the container 5 so as to extend, in use, out of the container 5 and overboard the vessel 2 until it reaches, with the end 12, a water surface on which the system 1 operates (the sea or other stretch of water where the intervention of the system 1 takes place).

The skimmer 14 is equipped with floats 16 configured to float on the water surface onto which it is placed and supports the inlet 13 of the suction pipe 8.

The pump 15 is a volumetric pump, so as to prevent (or in any case drastically limit) the formation of oil/water emulsions.

The separator device 7, in particular, is a coalescing plate separator device, comprising a treatment tank 20 and a set 21 of coalescing plates immersed in the tank 20 and equipped with coalescing surfaces.

Advantageously, the device comprises a set of plates (or trays) parallel to each other, inclined with respect to a horizontal plane and superimposed and vertically spaced with respect to one another. The plates can be substantially flat or corrugated and/or provided with channels. This type of device has been selected because such a device enables the oil/water separation process to be carried out with relative high efficiency.

It should be appreciated that, according to Stokes's law, the ascent rate of an oil particle is directly proportional to the square of its diameter. Therefore, the separation phenomenon underlying the separation process in a coalescing plate separator device (and in general in a coalescence separator device operating by contact on coalescing surfaces) is characterised, in brief, by the increase in the probability of contact between the oil particles, and thus by their increase in size as a result of the centrifugal action and contact between the particles caused by the plates (or, in general, by the coalescing surfaces), and therefore by the consequent increase in their ascent rate:

$$V_R = [g(\rho_W - \rho_O)D_O^2]/18_\eta$$

where:

$V_R$=ascent rate of the oil particle g=acceleration of gravity $\rho_W$=density of the water $\rho_O$=density of the oil $D_O$=diameter of the oil particle η=viscosity of the water In general, therefore, the oil/water separation process carried out in a coalescence separator device, in particular in a coalescing plate separator device or a separator device with comparable coalescing surfaces, occurs with considerable increase in speed and greater efficiency.

The tank 20 is provided with an inlet 22, located at a first longitudinal end of the tank 20 and connected to the suction pipe 8 for feeding the polluted water flow to the separator device 7; a water outlet 23, located at a second longitudinal end of the tank 20 and connected to a water drain pipe 24; and an oil outlet 25, associated with an oil collecting skimmer 26, located at an upper end of the tank 20 for collecting the oil that separates from the water in the separator device 7 and connected to an oil drain pipe 27.

The separator device 7 is provided with a recirculation system 30, comprising: a recirculation conduit 31 which branches off from the water drain pipe 24 and engages the suction pipe 8; a concentration meter 32 positioned along the water drain pipe 24 and configured to measure the oil concentration in the water stream exiting the separator device 7; a control unit 33 connected to the concentration meter 32 and to a three-way valve 34 positioned along the water drain pipe 24 and connected to the recirculation conduit 31.

In certain embodiments, the separator device 7 is also provided with a level alarm 35, which detects the level of the oil layer in the tank 20 and provides an alarm signal when a preset level is exceeded.

The water drain pipe 24 is provided with a circulation pump 36, located, for example, upstream of the three-way valve 34 and controlled by the control unit 33; and ends with a free end outlet 37.

The storage module 4 comprises a tank 40, housed in the container 5 of the storage module 4 and provided with an inlet 41 connected, via a releasable joint, to the oil drain pipe 27 and thus to the oil collecting skimmer 26 of the separator device 7.

Advantageously, the water drain pipe 24 and/or the oil drain pipe 27 are flexible pipes, or comprise at least respective portions consisting of flexible pipes, which can be unwound from one of the modules 3, 4.

In operation, when a spillage of liquid hydrocarbons occurs in the water, the modules 3, 4 are transported to the site of the spillage from the vessel 2. If the modules 3, 4, before being used, are kept in another place, they may be transported by truck and/or train to a harbour and then loaded onto the vessel 2. Depending on the extent of the spillage, a plurality of treatment modules 3 and/or storage modules 4 can be used.

When the vessel 2 reaches the polluted area, the suction pipe 8 is unwound, placing the end 12 with the inlet 13 on the surface of the water to be treated, such as contained with floating booms.

The skimmer 14, supported by its floats 16, floats on the surface of the water where the hydrocarbons/pollutants are located. By operating the pump 15, a surface layer of the polluted water, containing the hydrocarbons/pollutants, is sucked into the suction pipe 8, through the skimmer 14.

The use of a volumetric pump 15 and the absence of centrifugal pumps, as well as the absence of rotating parts in the separator device, prevents or at least drastically limits the formation of oil/water emulsions, which would drastically reduce the efficiency of the separation in terms of time.

The drawn fluid (water polluted by hydrocarbons) reaches the separator device 7 of the module 3, where the hydrocarbons immediately separate from the water.

In particular, the water flows through the separator device 7 with laminar motion: the oil droplets suspended in the treated water flow cluster together on the lower faces of the plates of the coalescing plate separator device 7, thereby forming larger drops which rise to the surface towards a free surface of the tank 20, where a layer of oil forms, which flows out through the oil collecting skimmer 26. Any sediments slide on the upper faces of the plates and precipitate onto the bottom of the tank 20 from where they can be optionally removed through a bottom drain 45.

The separator device 7 separates the oily part with the polluting hydrocarbons from the water: the pollutants are conveyed, through the oil drain pipe 27, into the tank 40 of the storage module 4 and/or into other tanks 43 of the vessel 2 if available, in order to be transported to a plant for the final treatment and recovery of hydrocarbons.

Advantageously, the pollutant (oil) separated by the separator device 7 is conveyed by gravity into the tank 40 of the storage module 4, suitably positioned with respect to the treatment module 3 (for example, by positioning the module 3 above the module 4, the modules 3, 4 being stackable, like all intermodal containers, and optionally connectable to each other via their respective connecting elements 6).

However, if necessary, the oil drain pipe 27 can be equipped with a circulation pump (not shown).

Once the tank 40 of a first storage module 4 is filled, it is detached from the oil drain pipe 27 and sealed to be transported to the final treatment. If necessary, further storage modules 4 are then connected to the treatment module 3 via the oil drain pipe 27.

The purified water, instead, flows into the water drain pipe 24.

The control unit 33, by using the concentration meter 32, detects the concentration of pollutants in the water stream exiting the separator device 7. If the concentration of pollutants detected is higher than a predetermined threshold (for example, 15 ppm), the control unit 33 controls the three-way valve 34 by activating the recirculation system 30, and the water stream is recirculated to the separator device 7 to be further treated.

The treated water is discharged into the sea through the water drain pipe 24 only if the control unit detects a hydrocarbon content that is below the predetermined threshold.

Figure 4:
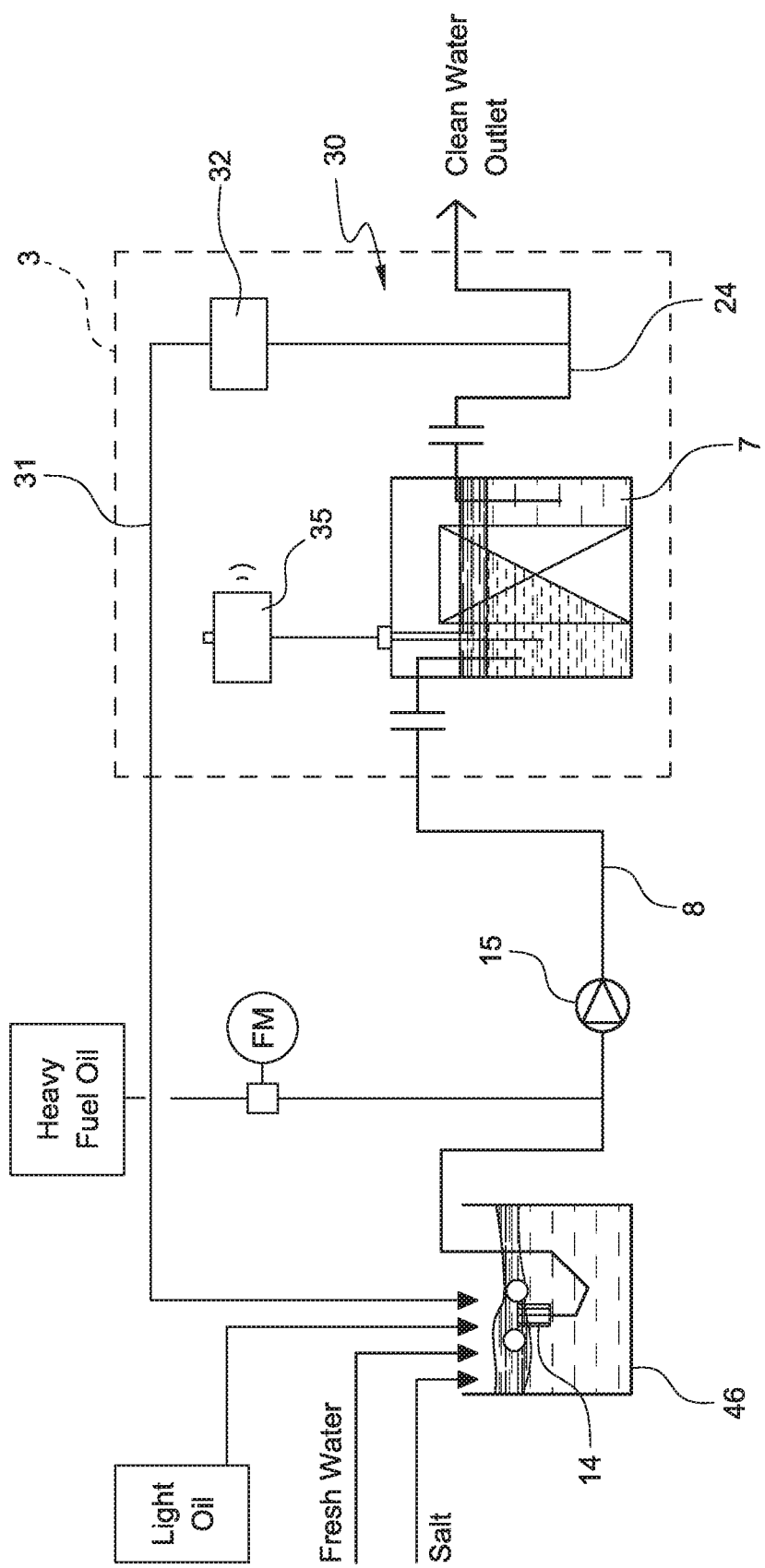
FIG. 4 is a schematic view that illustrates the execution of laboratory tests carried out with the system of the present disclosure.

With reference also to FIG. 4, the effectiveness of the system 1 has been tested in the laboratory, by simulating typical situations of pollution of seawater by liquid hydrocarbons at relatively high concentrations.

A treatment module 3, provided with a separator device 7 as described above, connected to a suction pipe 8 provided with a pump 15 and a floating skimmer 14, has been reproduced in the laboratory.

In particular, a coalescing plate separator device with inner dimensions of 800 mm×1000 mm×1000 mm has been used.

The skimmer 14 was placed in a test tank 46 in which salt water was prepared by dissolving a suitable quantity of salt (sodium chloride, with a concentration comparable to its average concentration in seawater) in fresh water.

Light and/or heavy hydrocarbons were added to the salt water.

A first test, reproducing a situation of pollution by light hydrocarbons (light oil), was carried out as follows:
  total salt water pumped during the test: 1000 liters/hour
  total light oil present: 48 liters
  input oil concentration: 4.8% (48000 parts per million)
  maximum oil concentration detected at the outlet: 30 parts per million (after a single passage; the outlet concentration is further reduced by activating the recirculation through the recirculation system 30).

A second test, reproducing a situation of pollution by heavy hydrocarbons (heavy oil), was carried out as follows:

total salt water pumped during the test: 1000 liters in 64 minutes total heavy oil present: 71 liters input oil concentration: 6.7% (67000 parts per million)

maximum oil concentration detected at the outlet: 24 parts per million (after a single passage; the outlet concentration is further reduced by activating the recirculation through the recirculation system 30).

Further tests were carried out by changing the concentrations of the pollutants and/or the flow rates of the treated fluid.

Fully satisfactory results were obtained in all cases.

The laboratory tests carried out also showed relatively greater efficiency with higher pollutant concentration values.

It is understood that the system as described and illustrated herein can be subject to modifications and variations that do not depart from the scope of the accompanying claims. Accordingly, various changes and modifications to the presently disclosed embodiments will be apparent to those skilled in the art.

The invention claimed is:

1. A transportable polluted water modular system comprising:
   a containerized treatment module comprising an intermodal container including a transportation connecting element and which houses a coalescence separator device configured to operate an oil/water separation;
   a suction pipe having a first end connected to the coalescence separator device and a second end with an inlet connectable to a floatable skimmer;
   a volumetric pump positioned along the suction pipe and configured to vary a volume of a chamber of the volumetric pump to transport polluted water through the floatable skimmer into the suction pipe;
   a water drain pipe connected to a water outlet of the coalescence separator device, the water drain pipe being distinct from the suction pipe; and
   an oil drain pipe connected to an oil outlet of the coalescence separator device, the oil drain pipe being distinct from the suction pipe.

2. The transportable polluted water modular system of claim 1, wherein the coalescence separator device defines a plurality of coalescence surfaces.

3. The transportable polluted water modular system of claim 2, wherein the plurality of coalescence surfaces are immersible in a treatment tank.

4. The transportable polluted water modular system of claim 2, wherein the coalescence separator device comprises a coalescing plate separator device, and a set of coalescing plates defining the plurality of coalescing surfaces.

5. The transportable polluted water modular system of claim 1, wherein the floatable skimmer comprises a float configured to float on a water surface.

6. The transportable polluted water modular system of claim 1, wherein the suction pipe comprises a flexible pipe configured to be unwound from the intermodal container to extend, in use, out of the intermodal container and overboard a vessel until the second end of the suction pipe reaches a water surface.

7. The transportable polluted water modular system of claim 1, wherein the coalescence separator device comprises a recirculation system comprising:
   a recirculation conduit that branches off from the water drain pipe and engages the suction pipe;
   a concentration meter positioned along the water drain pipe and configured to measure an oil concentration in a water stream exiting the coalescence separator device; and
   a control unit connected to the concentration meter and to a three-way valve positioned along the water drain pipe and connected to the recirculation conduit.

8. The transportable polluted water modular system of claim 1, wherein the coalescence separator device comprises a level alarm configured to provide an alarm signal when a detected level of an oil layer in a treatment tank exceeds a preset level.

9. The transportable polluted water modular system of claim 1, wherein at least a portion of at least one of the water drain pipe and the oil drain pipe is a flexible pipe configured to be unwound from the containerized treatment module.

10. The transportable polluted water modular system of claim 1, further comprising a containerized storage module comprising another intermodal container that houses a tank comprising an inlet connectable, via a releasable joint, to the oil drain pipe.

* * * * *